United States Patent [19]

Chen et al.

[11] Patent Number: 5,751,745
[45] Date of Patent: May 12, 1998

[54] MEMORY IMPLEMENTED ERROR DETECTION AND CORRECTION CODE WITH ADDRESS PARITY BITS

[75] Inventors: Chin-Long Chen, Fishkill; Mu-Yue Hsiao, Poughkeepsie, both of N.Y.; Walter Heinrich Lipponer, Ammerbuch, Germany; William Wu Shen, Poughkeepsie, N.Y.

[73] Assignee: International Business Machines Corporation, Armonk, N.Y.

[21] Appl. No.: 824,098

[22] Filed: Mar. 25, 1997

Related U.S. Application Data

[62] Division of Ser. No. 570,446, Dec. 11, 1995, Pat. No. 5,691,996.

[51] Int. Cl.[6] .................................................. G11C 29/00
[52] U.S. Cl. .................................... 371/51.1; 371/49.2
[58] Field of Search .................................. 371/51.1, 49.1, 371/49.2, 49.3, 40.3; 364/266.3, 944.92; 395/185.06

[56] References Cited

U.S. PATENT DOCUMENTS

| 3,531,631 | 9/1970 | Burgess | 371/51.1 |
| 3,555,255 | 1/1971 | Tay et al. | 371/49.2 |
| 4,443,876 | 4/1984 | Ng | 371/51.1 |
| 4,747,106 | 5/1988 | Wakimoto | 371/49.2 |

Primary Examiner—Robert W. Beausoliel, Jr.
Assistant Examiner—Trinh L. Tu
Attorney, Agent, or Firm—Lily Neff

[57] ABSTRACT

A method and apparatus for performing digital signal error detection through the use of a string of received incoming system address bits. The incoming address bits are divided into groups according to whether they contain a high value of "1" or a low value of "0". At least one address parity bit is then generated from each group and used in checking the integrity of data received.

7 Claims, 8 Drawing Sheets

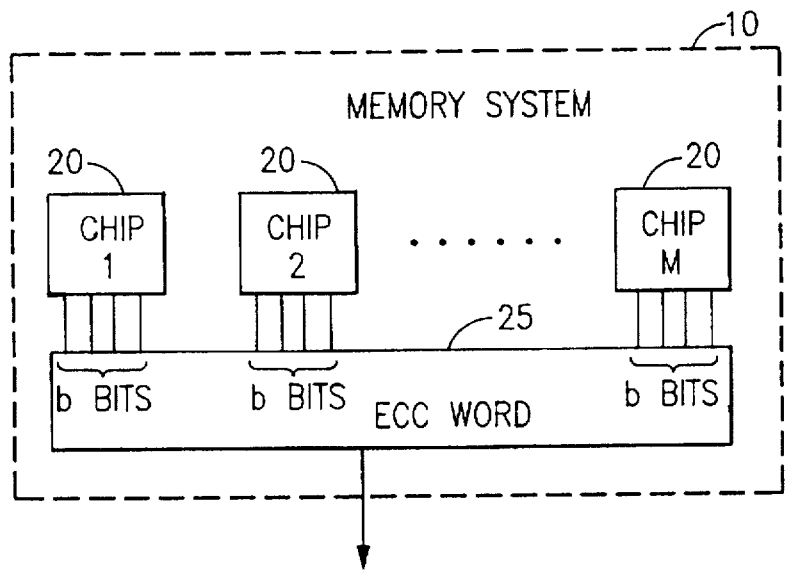
FIG.1
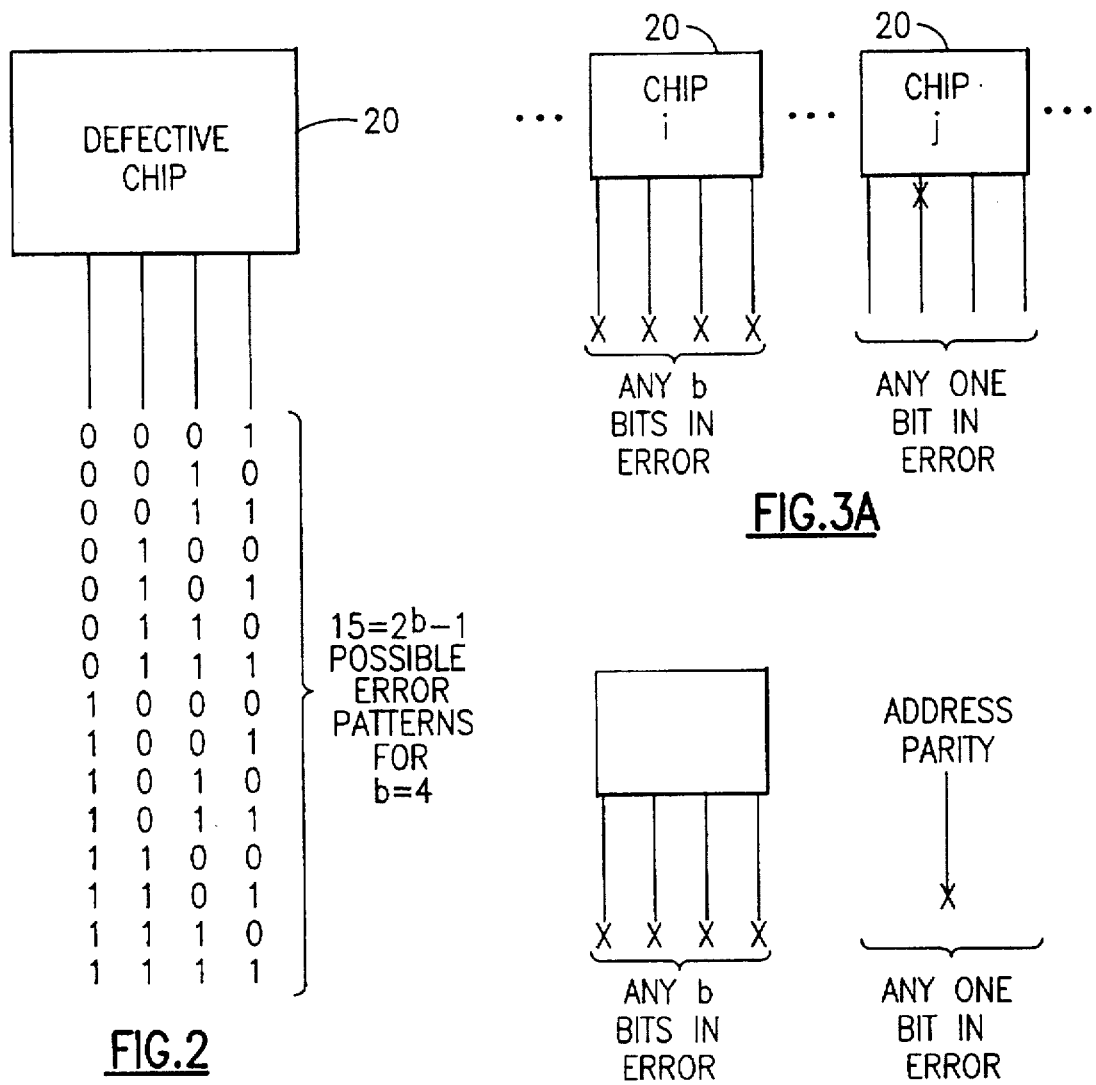
FIG.2
FIG.3A
FIG.3B

FROM STORE ECC

90 {
- SEC_O_H(0..3)
- SEC_O_H(4..7)
- SEC_O_H(8..11)
- SEC_O_H(12..15)
- SEC_O_H(16..19)
- SEC_O_H(20..23)
- SEC_O_H(24..27)
- SEC_O_H(28..31)
- SEC_O_L(0..3)
- SEC_O_L(4..7)
- SEC_O_L(8..11)
- SEC_O_L(12..15)
- SEC_O_L(16..19)
- SEC_O_L(20..23)
- SEC_O_L(24..27)
- SEC_O_L(28..31)
- SEC_O_C(0..3)
- SEC_O_C(4..7)
- SEC_O_C(8..11)

TO FETCH ECC

92 {
- MDRMUX_H(0..3)
- MDRMUX_H(4..7)
- MDRMUX_H(8..11)
- MDRMUX_H(12..15)
- MDRMUX_H(16..19)
- MDRMUX_H(20..23)
- MDRMUX_H(24..27)
- MDRMUX_H(28..31)

94 {
- MDRMUX_L(0..3)
- MDRMUX_L(4..7)
- MDRMUX_L(8..11)
- MDRMUX_L(12..15)
- MDRMUX_L(16..19)
- MDRMUX_L(20..23)
- MDRMUX_L(24..27)
- MDRMUX_L(28..31)

96 {
- MDRMUX_C(0..3)
- MDRMUX_C(4..7)
- MDRMUX_C(8..11)

ARRAY OF DRAMS
ORGANIZED BY 4
(4 DATA BITS PER PACKAGE)

MEMORY IMPLEMENTED ERROR DETECTION AND CORRECTION CODE WITH ADDRESS PARITY BITS

This application is a divisional of application Ser. No. 08/570,446 filed Dec. 11, 1995, now U.S. Pat. No. 5,691,996.

BACKGROUND OF THE INVENTION

The present invention is generally directed to error correction, decoding and encoding systems found in digital devices. The present invention incorporates by reference the invention disclosed in U.S. Ser. No. 08/538,691 filed Oct. 3, 1995, entitled "error detection and correction code for four-bit-per-chip memory system directed to multi-bit-per chip computer memory systems in which error correction and detection apparatus are provided to acheive correction of all single symbol errors and the detection of all single symbol errors occurring with a single bit error in a second symbol. More particularly, the present invention is directed to a memory assignment scheme, which assigns error correction code words to selected array modules, and incorporates parity address bits in this assignment scheme in order to provide an error correction and detection method and apparatus capable of detecting a variety of errors, including the detection of data fetched from an erroneous address.

In a computer system having b bits of memory available per chip, the failure of each chip can cause one to b erroneous bits in the output data depending upon the failure mode and the data originally stored. A b bit symbol error pattern is used to indicate one of all of the possible $2^b-1$ error patterns in the b bits for each computer chip. Normal error correction and detection systems employed in such situations would involve the use of a single error correction (SEC) and double error detection (DED) code. The SEC-DED code, however, is neither effective in correcting symbol errors generated from single chip failures, nor is effective in detecting symbol errors generated from double chip failures. On the other hand, a single symbol error correction and double symbol error detection code, a so-called SSC-DSD code, would provide an effective error correction and detection means to acheive high reliability in a b bit per chip memory. However, SSC-DSP codes require more check bits and more memory chips than are actually necessary for the problem. In particular, for a 64-bit data bus, the required SSC-DSD code would require four redundant memory chips for every 16 data chips to implement a (78, 66) SSC-DSD code. Such codes would be 78 bits in length with 64 information bits and 14 check bits. Thus a memory system implementing this code would require 20 chips based upon the above memory organization.

Recognizing the stringent requirements of the SSC-DSD memory system, the present inventors devised a new coding scheme as described in detail in U.S. patent application Ser. No. 08/538,691 in which the number of redundant chips are decreased from 4 to 3 chips for a (76, 64) code for each set of 16 chips. This code is then used to correct all single symbol errors and detect all single symbol errors plus a single bit error in a second symbol. In certain instances, however, although the data in storage is error free, an error condition can occur if data is fetched from the wrong address in memory. However, the invention introduced in U.S. Ser. No. 08/538,691 never addressed the issue of detection of data fetched from an erroneous address.

The present invention utilizes the coding scheme suggested in U.S. Ser. No. 08/538,691, but improves upon the code by generating address parity bits from system address bits and later including these in the generation of ECC word. Accordingly, a more efficient and more reliable improved computer memory system is provided through the use of the present invention. All of these are desirable results.

This application is related in subject matter to two other disclosures, Ser. Nos. 08/570,447 and 08/570,448 both filed on the same day as this application.

SUMMARY OF THE INVENTION

In accordance with a preferred embodiment of the present invention, digital signal error detection is performed through the use of an apparatus and method for generating a plurality of address parity bits in a computer system from a string of received incoming system address bits. First the system address bits are divided into n groups. These n groups are then used in the generation of address parity bits with at least one address parity bit generated from each of said n groups.

In another embodiment of the present invention, the system address bits are divided into two groups. The first group having only high bits with a value of "1", and the second group having only low bits with a value or "0". The bits contained in each group is then subsequently combined to generate at least one high address parity bit, and a second low address parity bit.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is an overall block diagram illustrating a memory system in which a memory word is stored on k separate chips each providing b bits to a computer memory system register;

FIG. 2 is a functional block diagram illustrating the 15 possible error patterns for the case in which there are four bits per chip;

FIGS. 3A and 3B are functional block diagrams illustrating the limits of error detectability for the circuits of the present invention;

DETAILED DESCRIPTION OF THE INVENTION

The invention described below is particularly shown with respect to a particular example, namely the construction of a (76, 64) code for a four-bit per chip computer memory system. However, the ideas presented herein are extensible to the general b bit per chip situation. In particular, it is noted that the number of rows of b by b submatrices in the parity check matrix is determined by the error correction capabilities that are desired. In the particular instance of the codes constructed in accordance with the present invention, three rows of by b submatrices are sufficient to provide the desired correction and detection capabilities. Likewise in general, codes constructed in accordance with the present invention will have k symbols. Each symbol will be represented by b bits. Since three of the symbols are employed for redundancy, there are thus k−3 information symbols and 3 symbols which comprise check bits.

Figures 9, 9A:
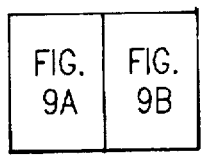
FIGS. 9, 9A and 9B illustrates the arrangement of data in memory modules on the SIMM array(s).

With respect to the present invention for a (76, 64) code, the parity check matrix for this code including an embodiment utilizing two address parity bits is given below:

The set of 64 data bits together with the 12 check bits form an ECC word. Therefore, it seems that in the embodiment presented in Table I, when the two address parity bits are included, the ECC word is really a (78, 66) code word. However, since the parity address bits have been used in the generation of the final 12 ECC check bits, it is unnecessary for them to be stored as part of the ECC word. Therefore, the code is still a (76, 64) code since only 76 bits per code word are stored into the memory array or a SIMM (Single-Inline-Memory-Module) as shown in FIG. 9. The address parity bits are regenerated again during the fetch operation from incoming system address bits.

The ECC word is divided into 19 groups of 4 bit symbols. In storing data, the ECC word is stored in 19 differnt chips.

TABLE I

| | | | | | | | DATA | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 1000 | 1000 | 1000 | 1000 | 1000 | 1000 | 1000 | 1000 | 1001 | 1101 | 1111 | 0011 | 1100 | 1100 | 1110 | 0110 |
| 0100 | 0100 | 0100 | 0100 | 0100 | 0100 | 0100 | 0100 | 0111 | 1011 | 1010 | 0010 | 1000 | 1000 | 1001 | 1101 |
| 0010 | 0010 | 0010 | 0010 | 0010 | 0010 | 0010 | 0010 | 0111 | 0110 | 1100 | 1111 | 0011 | 0011 | 1001 | 1011 |
| 0001 | 0001 | 0001 | 0001 | 0001 | 0001 | 0001 | 0001 | 1110 | 1101 | 1000 | 1010 | 0010 | 0010 | 0111 | 0110 |
| 0110 | 1000 | 0010 | 1011 | 1010 | 1101 | 0101 | 1110 | 1000 | 0001 | 1000 | 0111 | 1000 | 1110 | 1000 | 0100 |
| 1101 | 0100 | 0001 | 0110 | 0101 | 1011 | 1111 | 1001 | 0100 | 0011 | 0100 | 1110 | 0100 | 1001 | 0100 | 1100 |
| 1011 | 0010 | 1010 | 1101 | 1000 | 0110 | 0100 | 1001 | 0010 | 0101 | 0010 | 1110 | 0010 | 1001 | 0010 | 0001 |
| 0110 | 0001 | 0101 | 1011 | 0100 | 1101 | 1100 | 0111 | 0001 | 1111 | 0001 | 1001 | 0001 | 0111 | 0001 | 0011 |
| 1000 | 1110 | 0111 | 1010 | 1001 | 0010 | 0110 | 0001 | 0101 | 1000 | 1011 | 1000 | 0110 | 1000 | 0100 | 1000 |
| 0100 | 1001 | 1110 | 0101 | 0111 | 0001 | 1101 | 0011 | 1111 | 0100 | 0110 | 0100 | 1101 | 0100 | 1100 | 0100 |
| 0010 | 1001 | 1110 | 1000 | 0111 | 1010 | 1011 | 0101 | 0100 | 0010 | 1101 | 0010 | 1011 | 0010 | 0001 | 0010 |
| 0001 | 0111 | 1001 | 0100 | 1110 | 0101 | 0110 | 1111 | 1100 | 0001 | 1011 | 0001 | 0110 | 0001 | 0011 | 0001 |

| | ECC | | | SYMBOL ID (CHIP) ID | ADDRESS PARITY BITS |
|---|---|---|---|---|---|
| | 17 | 18 | 19 | | 20 |
| | 1000 | 0000 | 0000 | ----- | 01 |
| | 0100 | 0000 | 0000 | ----- | 11 |
| | 0010 | 0000 | 0000 | ----- | 10 |
| | 0001 | 0000 | 0000 | ----- | 11 |
| | 0000 | 1000 | 0000 | ----- | 10 |
| | 0000 | 0100 | 0000 | ----- | 01 |
| | 0000 | 0010 | 0000 | ----- | 00 |
| | 0000 | 0001 | 0000 | ----- | 00 |
| | 0000 | 0000 | 1000 | ----- | 00 |
| | 0000 | 0000 | 0100 | ----- | 00 |
| | 0000 | 0000 | 0010 | ----- | 01 |
| | 0000 | 0000 | 0001 | ----- | 10 |

DATA STORE OPERATION

During a store operation, in accordance with the embodiment represented by the parity check matrix shown in Table I, each of the 12 ECC check bits is generated. The 12 ECC check bits are generated in two stages. During the first stage, a partial ECC check bit is generated by exclusive OR circuits which take a subset of 64 data bits as indicated by the 1's in each row of the parity check matrix in Table I. For example, the first partial check bit is generated by exclusive-ORing data found at positions: 1, 5, 9, 13, 17, 21, 25, 29, 33, 36, 37, 38, 40, 41, 42, 43, 44, 47, 48, 49, 50, 53, 54, 57, 58, 59, 62 and 63.

These address parity bits are generated from selective combination of data from system address bits as discussed later in detail. During the second stage the partial check bits are combined with the address parity bits and data bits to generate the final 12 ECC check bits.

That is each symbol is stored on a different chip. This situation is illustrated in FIG. 1 wherein memory system 10 is shown to be organized using m chips with b bits being delivered from each chip at a time. Thus, the ECC word in register 25 is mb bits long. For the example illustrated herein, m=19 and b=4.

When an array chip, say chip i, fails the data stored in that chip may or may not be in error depending on the data stored. If the data is in error, the number of errors may be one or more than one. FIG. 2 illustrates all of the possible error patterns $2^b-1=15$ for a failed chip i. FIGS. 3A and 3B illustrate the limits of error detectability in the present invention. FIG. 3A particularly shows the situation in which chip i produces from one to four errors while only a single error occurs in chip j. Reference numeral 20 in FIGS. 1 through 3 refer to the individual memory chips. FIG. 3B illustrates the situation in which chip i produces from one to four errors while only a single error occurs in address parity.

At the outset of a store operation data bits are stored in a plurality of storage buffers. In the example illustrated in Table II, given below, the 64 data bits are first stored in two storage buffers named STBUF_H_D(0 . . . 31) and STBUF_L_D(0 . . . 31), respectively. There are 32 bits of data in each storage buffer and these bits are renamed as SEC_O_H(0 . . . 31) and SEC_O_L(0 . . . 31) when wired into the memory modules, namely the modules of a SIMM.

TABLE II

| STBUF_H_D(0 . . 31) | | | | | | | |
|---|---|---|---|---|---|---|---|
| 0123 | 4567 | 11 8901 | 1111 2345 | 1111 6789 | 2222 0123 | 2222 4567 | 2233 8901 |
| 1000 | 1000 | 1000 | 1000 | 1000 | 1000 | 1000 | 1000 |
| 0100 | 0100 | 0100 | 0100 | 0100 | 0100 | 0100 | 0100 |
| 0010 | 0010 | 0010 | 0010 | 0010 | 0010 | 0010 | 0010 |
| 0001 | 0001 | 0001 | 0001 | 0001 | 0001 | 0001 | 0001 |
| 0110 | 1000 | 0010 | 1011 | 1010 | 1101 | 0101 | 1110 |
| 1101 | 0100 | 0001 | 0110 | 0101 | 1011 | 1111 | 1001 |
| 1011 | 0010 | 1010 | 1101 | 1000 | 0110 | 0100 | 1001 |
| 0110 | 0001 | 0101 | 1011 | 0100 | 1101 | 1100 | 0111 |
| 1000 | 1110 | 0111 | 1010 | 1001 | 0010 | 0110 | 0001 |
| 0100 | 1001 | 1110 | 0101 | 0111 | 0001 | 1101 | 0011 |
| 0010 | 1001 | 1110 | 1000 | 0111 | 1010 | 1011 | 0101 |
| 0001 | 0111 | 1001 | 0100 | 1110 | 0101 | 0110 | 1111 |

| STBUF_L_D(0 . . 31) | | | | | | | | SEC_O_C(0 . . 11) | | | STORE_ADDRP_D(0 . . 1) 11 11 |
|---|---|---|---|---|---|---|---|---|---|---|---|
| 0123 | 4567 | 11 8901 | 1111 2345 | 1111 6789 | 2222 0123 | 2222 4567 | 2233 8901 | 0123 | 4567 | 11 8901 | 11 01 |
| 1001 | 1101 | 1111 | 0011 | 1100 | 1100 | 1110 | 0110 | 1000 | 0000 | 0000 | 01 |
| 0111 | 1011 | 1010 | 0010 | 1000 | 1000 | 1001 | 1101 | 0100 | 0000 | 0000 | 11 |
| 0111 | 0110 | 1100 | 1111 | 0011 | 0011 | 1001 | 1011 | 0010 | 0000 | 0000 | 10 |
| 1110 | 1101 | 1000 | 1010 | 0010 | 0010 | 0111 | 0110 | 0001 | 0000 | 0000 | 11 |
| 1000 | 0001 | 1000 | 0111 | 1000 | 1110 | 1000 | 0100 | 0000 | 1000 | 0000 | 10 |
| 0100 | 0011 | 0100 | 1110 | 0100 | 1001 | 0100 | 1100 | 0000 | 0100 | 0000 | 01 |
| 0010 | 0101 | 0010 | 1110 | 0010 | 1001 | 0010 | 0001 | 0000 | 0010 | 0000 | 00 |
| 0001 | 1111 | 0001 | 1001 | 0001 | 0111 | 0001 | 0011 | 0000 | 0001 | 0000 | 00 |
| 0101 | 1000 | 1011 | 1000 | 0110 | 1000 | 0100 | 1000 | 0000 | 0000 | 1000 | 00 |
| 1111 | 0100 | 0110 | 0100 | 1101 | 0100 | 1100 | 0100 | 0000 | 0000 | 0100 | 00 |
| 0100 | 0010 | 1101 | 0010 | 1011 | 0010 | 0001 | 0010 | 0000 | 0000 | 0010 | 01 |
| 1100 | 0001 | 1011 | 0001 | 0110 | 0001 | 0011 | 0001 | 0000 | 0000 | 0001 | 10 |

The address parity bits are located in address buffers indicated as STORE_ADDRP_D(0 . . . 1) in Table II above. The address parity bits are generated from selective combination of data from system address bits as shown in the example provided below in Table III.

TABLE III

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | 0 | 1 | 1 | 0 | 0 | 0 | 0 | 0 | 0 | 0 | 0 | 0 | 1 | 1 | 1 | 1 | 1 | 1 | 1 | 1 | 1 | 1 | 1 | 1 | 0 | | | | | | |
| | | | | | | | | | | | | | | | | | | | | | | | | | | | ADDRESS PARITY BITS | | | | | |
| | | | | | | | | | | | | | | | | | | | SYSTEM ADDRESS | | | | | | | | | | | | | |
| 2 2 | 3 0 | 3 1 | 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 2 9 | 3 0 3 1 |
| BYTE 3 | | | | BYTE 4 | | | | | | | | | BYTE 5 | | | | | | | | | | | | | | | | | BYTE 7 | | |
| 4 5 | 6 | 7 | 0 1 | 2 3 | 4 | 5 | 6 | 7 | 0 | 1 | 2 3 | 4 | 5 | 6 | 7 | 0 1 | 2 | 3 | 4 | 5 | 6 | 7 | 0 | 1 | 2 | 3 | 4 | 5 | 6 7 |

| Card type | | | | | | | | | | | | | | | |
|---|---|---|---|---|---|---|---|---|---|---|---|---|---|---|---|
| 4 Mbit 1 card | | | | R E1 | R E0 | R 11 | R 10 | R 9 | R 8 | R 7 | R 6 | R 5 | R 4 | R 3 R 2 | R 1 R 0 | C 9 | C 8 | C 7 | C 6 | C 5 | C 4 | C 3 | C 2 | C 1 | E 0 | C 0 | ICASI IDECI | BYTE OFFSET |
| 16 Mbit 1 card | | | | | | R 11 | R 10 | R 9 | R 8 | R 7 | R 6 | R 5 | R 4 | R 3 R 2 | R 1 R 0 | C 9 | C 8 | C 7 | C 6 | C 5 | C 3 | C 2 | C 1 | C 0 | E 0 | C 0 | ICASI IDECI | BYTE OFFSET |
| 64 Mbit 1 card | | | | | | | | NOT USED | | | | | | | | | | | | | | | | | | | | |
| 4 Mbit 2 card | | | R E1 | R 01 | | R 11 | R 10 | R 9 | R 8 | R 7 | R 6 | R 5 | R 4 | R 3 R 2 | R 1 R 0 | C 9 | C 8 | C 7 | C 6 | C 5 | C 3 | C 2 | C 1 | C 0 | E 0 | C 0 | ICASI IDECI | BYTE OFFSET |
| 16 Mbit 2 card | | | | R E1 | R 01 | R 11 | | | | | | | | R 4 | R 3 R 2 | R 1 R 0 | C 9 | C 8 | C 7 | C 6 | C 5 | C 3 | C 2 | C 1 | C 0 | E 0 | C 0 | ICASI IDECI | BYTE OFFSET |
| 64 Mbit 2 card | | | | | | | | NOT USED | | | | | | | | | | | | | | | | | | | | |
| 4 Mbit 4 card | | R E1 | R 01 | R 11 | R E0 | R 11 | | | | | | | | R 4 | R 3 R 2 | R 1 R 0 | C 9 | C 8 | C 7 | C 6 | C 5 | C 2 | C 1 | C 0 | E 0 | C 0 | ICASI IDECI | BYTE OFFSET |
| 16 Mbit 4 card | R E1 | | R 01 | R 11 | R E0 | R 0 | | | | | | | | R 4 | R 3 R 2 | R 1 R 0 | C 9 | C 8 | C 7 | C 6 | C 5 | C 2 | C 1 | C 0 | E 0 | C 0 | ICASI IDECI | BYTE OFFSET |
| 64 Mbit 4 card | R E1 | C 11 | C 01 | R 11 | R E0 | R 0 | | | | | | | | R 4 | R 3 R 2 | R 1 R 0 | C 9 | C 8 | C 7 | C 6 | C 5 | C 2 | C 1 | C 0 | E 0 | C 0 | ICASI IDECI | BYTE OFFSET |

CD means memory card selection bit
C0-C11 means Column Address 0-11
R0-R11 means Row Address 0-11
EO means even/odd lines (on STC inter-leaving)
RE means RAS A/B decode STORE_ADDRP_D(0) is generated from the parity of system address bits 1, 2, 5–14, 26, 27 and 30. Similarly, STORE_ADDRP_D(1) is the parity of system address bits 0, 3, 4, 5–25, and 31. As illustrated in table III, the mapping of system address bits to memory module depends on the size of the modules.

The final ECC check bits are then generated by combining the contents of the STORE_ADDRP with the data stored in the storage buffers STBUF and the data obtained from the partial check bits generated from the Exclusive-Or circuitry. In short, during the first stage, the partial check bits SY0(0 . . . 11) are generated from the high word data word STBUF_H_D(0 . . . 31) and SY1(0 . . . 11) are generated from the low data word STBUF_L_D(0 . . . 31). Then SY0 and SY1 and address parity bits are combined to produce the final check bits. The final 12 ECC check bits are stored in SEC_O_C(0 . . . 11) buffer. The following equation illustrates in detail the generation of the 12 ECC check bits and their final storage in the SEC_O_C(0 . . . 11) buffer.

The notation OPA(X || Y || Z) is used to describe a logic function that implements the odd parity of bits X, Y and Z. The generation of check bits is divided in two stages as mentioned earlier.

```
/********* STORE ECC ***********************************************/
/*****************************************************************/ /*>
      CHECKBIT GENERATION                   <*/
/*****************************************************************/

SY0(0)   :=
    OPA  (STBUF_H_D(0)    | STBUF_H_D(4)    | STBUF_H_D(8)    | STBUF_H_D(12)
       |  STBUF_H_D(16)   | STBUF_H_D(20)   | STBUF_H_D(24)   | STBUF_H_D(28));
SY1(0)   :=
    OPA  (STBUF_L_D(0)    | STBUF_L_D(3)    | STBUF_L_D(4)    | STBUF_L_D(5)
       |  STBUF_L_D(7)    | STBUF_L_D(8)    | STBUF_L_D(9)    | STBUF_L_D(10)
       |  STBUF_L_D(11)   | STBUF_L_D(14)   | STBUF_L_D(15)   | STBUF_L_D(16)
       |  STBUF_L_D(17)   | STBUF_L_D(20)   | STBUF_L_D(21)   | STBUF_L_D(24)
       |  STBUF_L_D(25)   | STBUF_L_D(26)   | STBUF_L_D(29)   | STBUF_L_D(30));
SY0(1)   :=
    OPA  (STBUF_H_D(1)    | STBUF_H_D(5)    | STBUF_H_D(9)    | STBUF_H_D(13)
       |  STBUF_H_D(17)   | STBUF_H_D(21)   | STBUF_H_D(25)   | STBUF_H_D(29));
SY1(1)   :=
    OPA  (STBUF_L_D(1)    | STBUF_L_D(2)    | STBUF_L_D(3)    | STBUF_L_D(4)
       |  STBUF_L_D(6)    | STBUF_L_D(7)    | STBUF_L_D(8)    | STBUF_L_D(10)
       |  STBUF_L_D(14)   | STBUF_L_D(16)   | STBUF_L_D(20)   | STBUF_H_D(24)
       |  STBUF_L_D(27)   | STBUF_L_D(28)   | STBUF_L_D(29)   | STBUF_H_D(31));
SY0(2)   :=
    OPA  (STBUF_H_D(2)    | STBUF_H_D(6)    | STBUF_H_D(10)   | STBUF_H_D(14)
       |  STBUF_H_D(18)   | STBUF_H_D(22)   | STBUF_H_D(26)   | STBUF_H_D(30));
SY1(2)   :=
    OPA  (STBUF_L_D(1)    | STBUF_L_D(2)    | STBUF_L_D(3)    | STBUF_L_D(5)
       |  STBUF_L_D(6)    | STBUF_L_D(8)    | STBUF_L_D(9)    | STBUF_L_D(12)
       |  STBUF_L_D(13)   | STBUF_L_D(14)   | STBUF_L_D(15)   | STBUF_L_D(18)
       |  STBUF_L_D(19)   | STBUF_L_D(22)   | STBUF_L_D(23)   | STBUF_L_D(24)
       |  STBUF_L_D(27)   | STBUF_L_D(28)   | STBUF_L_D(30)   | STBUF_L_D(31));
SY0(3)   :=
    OPA  (STBUF_H_D(3)    | STBUF_H_D(7)    | STBUF_H_D(11)   | STBUF_H_D(15)
       |  STBUF_H_D(19)   | STBUF_H_D(23)   | STBUF_H_D(27)   | STBUF_H_D(31));
SY1(3)   :=
    OPA  (STBUF_L_D(0)    | STBUF_L_D(1)    | STBUF_L_D(2)    | STBUF_L_D(4)
       |  STBUF_L_D(5)    | STBUF_L_D(7)    | STBUF_L_D(8)    | STBUF_L_D(12)
       |  STBUF_L_D(14)   | STBUF_L_D(18)   | STBUF_L_D(22)   | STBUF_L_D(25)
       |  STBUF_L_D(26)   | STBUF_L_D(27)   | STBUF_L_D(29)   | STBUF_L_D(30));
SY0(4)   :=
    OPA  (STBUF_H_D(1)    | STBUF_H_D(2)    | STBUF_H_D(4)    | STBUF_H_D(10)
       |  STBUF_H_D(12)   | STBUF_H_D(14)   | STBUF_H_D(15)   | STBUF_H_D(16)
       |  STBUF_H_D(18)   | STBUF_H_D(20)   | STBUF_H_D(21)   | STBUF_H_D(23)
       |  STBUF_H_D(25)   | STBUF_H_D(27)   | STBUF_H_D(28)   | STBUF_H_D(29)
       |  STBUF_H_D(30));
SY1(4)   :=
    OPA  (STBUF_L_D(0)    | STBUF_L_D(7)    | STBUF_L_D(8)    | STBUF_L_D(13)
       |  STBUF_L_D(14)   | STBUF_L_D(15)   | STBUF_L_D(16)   | STBUF_L_D(20)
       |  STBUF_L_D(21)   | STBUF_L_D(22)   | STBUF_L_D(24)   | STBUF_L_D(29));
SY0(5)   :=
    OPA  (STBUF_H_D(0)    | STBUF_H_D(1)    | STBUF_H_D(3)    | STBUF_H_D(5)
       |  STBUF_H_D(11)   | STBUF_H_D(13)   | STBUF_H_D(14)   | STBUF_H_D(17)
       |  STBUF_H_D(19)   | STBUF_H_D(20)   | STBUF_H_D(22)   | STBUF_H_D(23)
       |  STBUF_H_D(24)   | STBUF_H_D(25)   | STBUF_H_D(26)   | STBUF_H_D(27)
       |  STBUF_H_D(28)   | STBUF_H_D(31));
SY1(5)   :=
    OPA  (STBUF_L_D(1)    | STBUF_L_D(6)    | STBUF_L_D(7)    | STBUF_L_D(9)
       |  STBUF_L_D(12)   | STBUF_L_D(13)   | STBUF_L_D(14)   | STBUF_L_D(17)
       |  STBUF_L_D(20)   | STBUF_L_D(23)   | STBUF_L_D(25)   | STBUF_L_D(28)
       |  STBUF_L_D(29));
SY0(6)   :=
    OPA  (STBUF_H_D(0)    | STBUF_H_D(2)    | STBUF_H_D(3)    | STBUF_H_D(6)
       |  STBUF_H_D(8)    | STBUF_H_D(10)   | STBUF_H_D(12)   | STBUF_H_D(13)
       |  STBUF_H_D(15)   | STBUF_H_D(16)   | STBUF_H_D(21)   | STBUF_H_D(22)
       |  STBUF_H_D(25)   | STBUF_H_D(28)   | STBUF_H_D(31));
```

```
SY1(6)      :=
    OPA  (STBUF_L_D(2)    | STBUF_L_D(5)    | STBUF_L_D(7)    | STBUF_L_D(10)
    |     STBUF_L_D(12)   | STBUF_L_D(13)   | STBUF_L_D(14)   | STBUF_L_D(18)
    |     STBUF_L_D(20)   | STBUF_L_D(23)   | STBUF_L_D(26)   | STBUF_L_D(31));
SY0(7)      :=
    OPA  (STBUF_H_D(1)    | STBUF_H_D(2)    | STBUF_H_D(7)    | STBUF_H_D(9)
    |     STBUF_H_D(11)   | STBUF_H_D(12)   | STBUF_H_D(14)   | STBUF_H_D(15)
    |     STBUF_H_D(17)   | STBUF_H_D(20)   | STBUF_H_D(21)   | STBUF_H_D(23)
    |     STBUF_H_D(24)   | STBUF_H_D(25)   | STBUF_H_D(29)   | STBUF_H_D(30)
    |     STBUF_H_D(31));
SY1(7)      :=
    OPA  (STBUF_L_D(3)    | STBUF_L_D(4)    | STBUF_L_D(5)    | STBUF_L_D(6)
    |     STBUF_L_D(7)    | STBUF_L_D(11)   | STBUF_L_D(12)   | STBUF_L_D(15)
    |     STBUF_L_D(19)   | STBUF_L_D(21)   | STBUF_L_D(22)   | STBUF_L_D(23)
    |     STBUF_L_D(27)   | STBUF_L_D(30)   | STBUF_L_D(31));
SY0(8)      :=
    OPA  (STBUF_H_D(0)    | STBUF_H_D(4)    | STBUF_H_D(5)    | STBUF_H_D(6)
    |     STBUF_H_D(9)    | STBUF_H_D(10)   | STBUF_H_D(11)   | STBUF_H_D(12)
    |     STBUF_H_D(14)   | STBUF_H_D(16)   | STBUF_H_D(19)   | STBUF_H_D(22)
    |     STBUF_H_D(25)   | STBUF_H_D(26)   | STBUF_H_D(31));
SY1(8)      :=
    OPA  (STBUF_L_D(1)    | STBUF_L_D(3)    | STBUF_L_D(4)    | STBUF_L_D(8)
    |     STBUF_L_D(10)   | STBUF_L_D(11)   | STBUF_L_D(12)   | STBUF_L_D(17)
    |     STBUF_L_D(18)   | STBUF_L_D(20)   | STBUF_L_D(25)   | STBUF_L_D(28));
SY0(9)      :=
    OPA  (STBUF_H_D(1)    | STBUF_H_D(4)    | STBUF_H_D(7)    | STBUF_H_D(8)
    |     STBUF_H_D(9)    | STBUF_H_D(10)   | STBUF_H_D(13)   | STBUF_H_D(15)
    |     STBUF_H_D(17)   | STBUF_H_D(18)   | STBUF_H_D(19)   | STBUF_H_D(23)
    |     STBUF_H_D(24)   | STBUF_H_D(25)   | STBUF_H_D(27)   | STBUF_H_D(30)
    |     STBUF_H_D(31));
SY1(9)      :=
    OPA  (STBUF_L_D(0)    | STBUF_L_D(1)    | STBUF_L_D(2)    | STBUF_L_D(3)
    |     STBUF_L_D(5)    | STBUF_L_D(9)    | STBUF_L_D(10)   | STBUF_L_D(13)
    |     STBUF_L_D(16)   | STBUF_L_D(17)   | STBUF_L_D(19)   | STBUF_L_D(21)
    |     STBUF_L_D(24)   | STBUF_L_D(25)   | STBUF_L_D(29));
SY0(10)     :=
    OPA  (STBUF_H_D(2)    | STBUF_H_D(4)    | STBUF_H_D(7)    | STBUF_H_D(8)
    |     STBUF_H_D(9)    | STBUF_H_D(10)   | STBUF_H_D(12)   | STBUF_H_D(17)
    |     STBUF_H_D(18)   | STBUF_H_D(19)   | STBUF_H_D(20)   | STBUF_H_D(22)
    |     STBUF_H_D(24)   | STBUF_H_D(26)   | STBUF_H_D(27)   | STBUF_H_D(29)
    |     STBUF_H_D(31));
SY1(10)     :=
    OPA  (STBUF_L_D(1)    | STBUF_L_D(6)    | STBUF_L_D(8)    | STBUF_L_D(9)
    |     STBUF_L_D(11)   | STBUF_L_D(14)   | STBUF_L_D(16)   | STBUF_L_D(18)
    |     STBUF_L_D(19)   | STBUF_L_D(22)   | STBUF_L_D(27)   | STBUF_L_D(30));
SY0(11)     :=
    OPA  (STBUF_H_D(3)    | STBUF_H_D(5)    | STBUF_H_D(6)    | STBUF_H_D(7)
    |     STBUF_H_D(8)    | STBUF_H_D(11)   | STBUF_H_D(13)   | STBUF_H_D(16)
    |     STBUF_H_D(17)   | STBUF_H_D(18)   | STBUF_H_D(21)   | STBUF_H_D(23)
    |     STBUF_H_D(25)   | STBUF_H_D(26)   | STBUF_H_D(28)   | STBUF_H_D(29)
    |     STBUF_H_D(30)   | STBUF_H_D(31));
SY1(11)     :=
    OPA  (STBUF_L_D(0)    | STBUF_L_D(1)    | STBUF_L_D(7)    | STBUF_L_D(8)
    |     STBUF_L_D(10)   | STBUF_L_D(11)   | STBUF_L_D(15)   | STBUF_L_D(17)
    |     STBUF_L_D(18)   | STBUF_L_D(23)   | STBUF_L_D(26)   | STBUF_L_D(27)
    |     STBUF_L_D(31));

SEC_O_C(0)  := SY0(0)   XOR SY1(0)   XOR STORE_ADDRP_D(1);
SEC_O_C(1)  := SY0(1)   XOR SY1(0)   XOR STORE_ADDRP_D(0)
                                     XOR STORE_ADDRP_D(1);
SEC_O_C(2)  := SY0(2)   XOR SY1(2)   XOR STORE_ADDRP_D(0);
SEC_O_C(3)  := SY0(3)   XOR SY1(3)   XOR STORE_ADDRP_D(0)
                                     XOR STORE_ADDRP_D(1);
SEC_O_C(4)  := SY0(4)   XOR SY1(4)   XOR STORE_ADDRP_D(0);
SEC_O_C(5)  := SY0(5)   XOR SY1(5)   XOR STORE_ADDRP_D(1);
SEC_O_C(6)  := SY0(6)   XOR SY1(6)                        ;
SEC_O_C(7)  := SY0(7)   XOR SY1(7)                        ;
SEC_O_C(8)  := SY0(8)   XOR SY1(8)                        ;
SEC_O_C(9)  := SY0(9)   XOR SY1(9)                        ;
SEC_O_C(10) := SY0(10)  XOR SY1(10)  XOR STORE_ADDRP_D(1);
SEC_O_C(11) := SY0(11)  XOR SY1(11)  XOR STORE_ADDRP_D(0);
```

Figure 4:
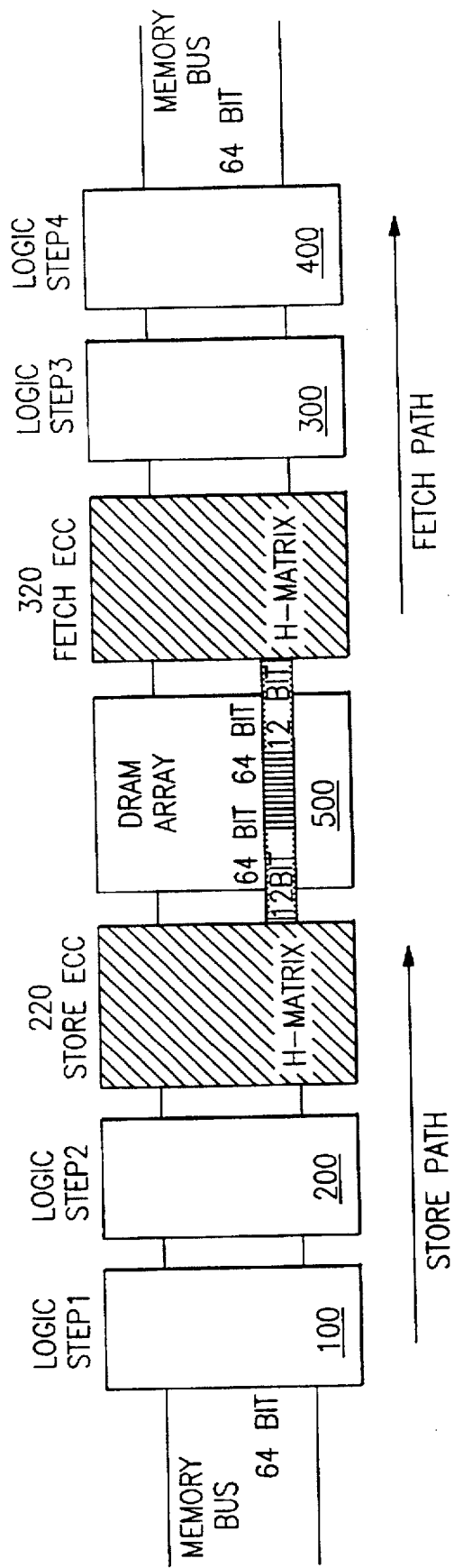
FIG. 4 is a general ECC (Error Correction Code) flow diagram, illustrating various staging registers and line buffers involved in the store and fetch operations for the present invention.

FIG. 4 is an illustration of the general ECC flow diagram. Logic steps 1 through 4, 100 through 400, are the various staging registers and line buffers used in the data store and data fetch operations. Logic steps 1 and 2, 100 and 200, involve different operations that finally allow the generation of ECC store operation 220 into the computer memory DRAM array 500. This information is later fetched from the DRAM array 500 to regenerate and decode the bits during the fetch operation, 300 through 400.

Figure 5:
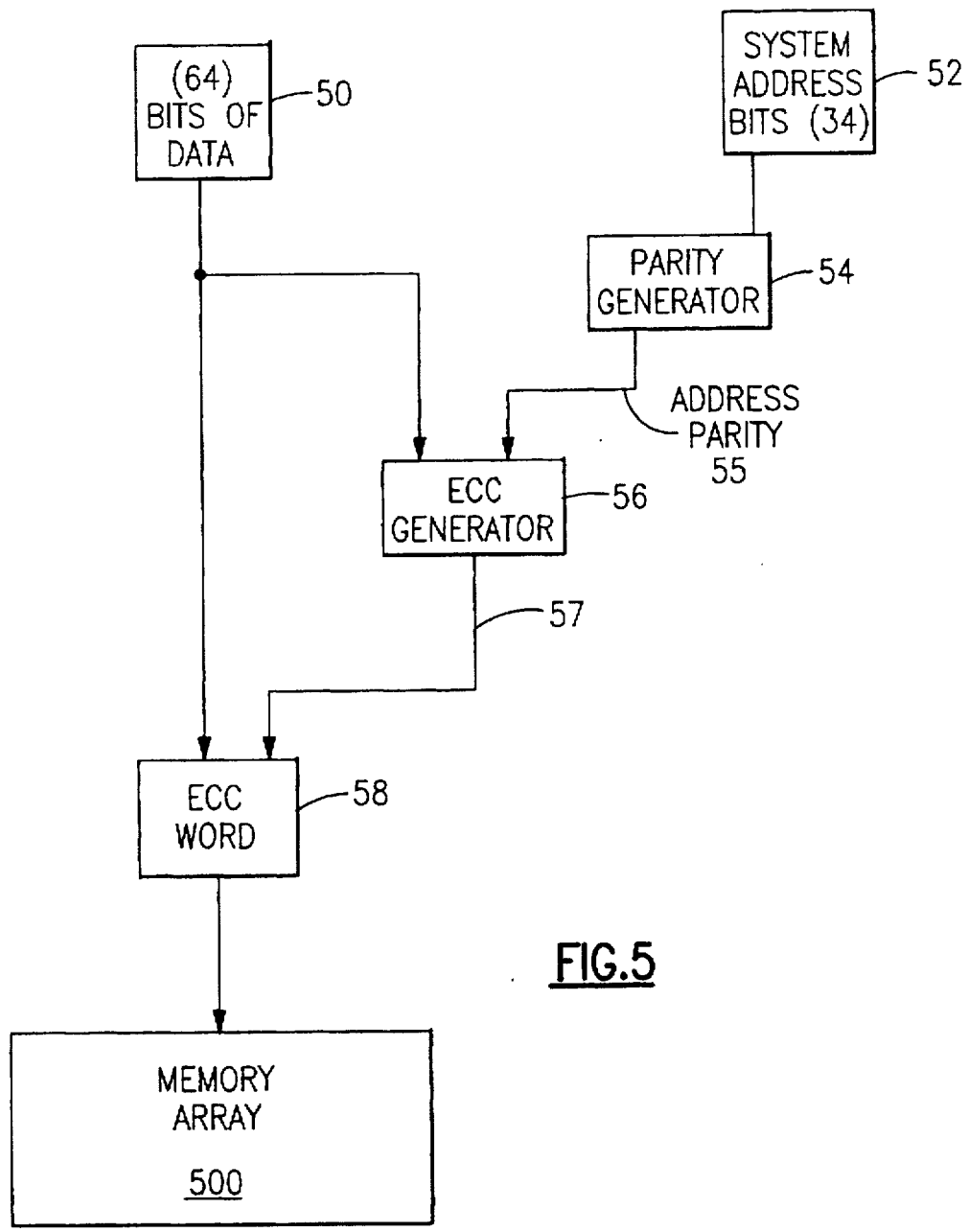
FIG. 5 is an illustration of the processing of bits during a data store operation.
Figure 6:
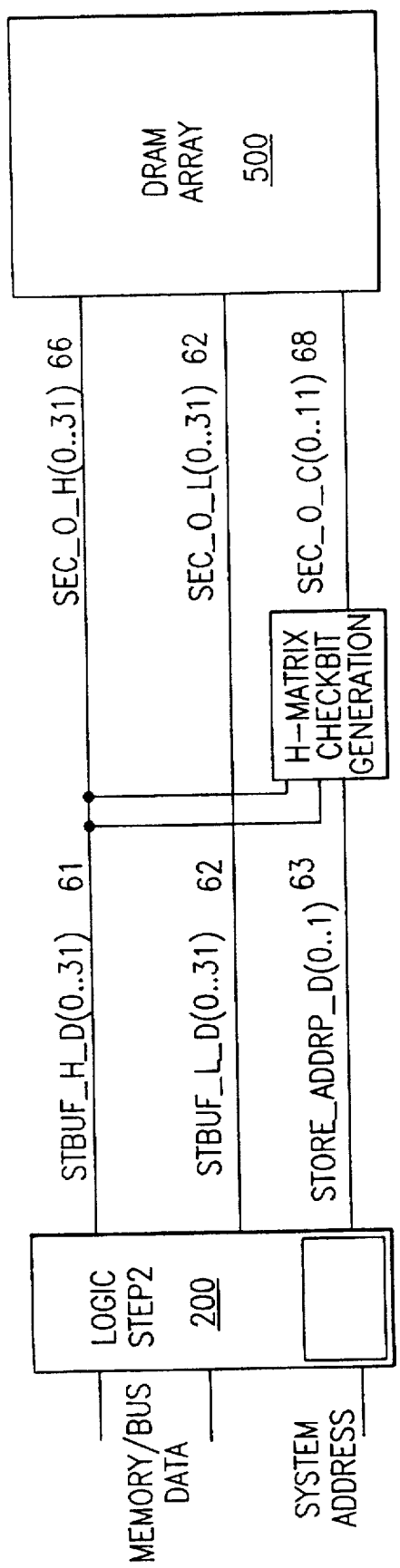
FIG. 6 is a further illustration of the operation of a data store command according to the concepts presented by the present invention.

During the store operation, the ECC check bits 57 are generated from the 64 data bits 50 and the system address bits 52 as shown FIG. 5. The entire ECC word 58 is then stored into a memory array 500 to be used later during a fetch operation. FIG. 6 shows the storage of data in storage arrays 61, 62 and 63 before the generation of check bits 66, 67 and 68.

Table I above is an embodiment of the present invention utilizing two address parity bits. Other embodiments are conceivable, however, in accordance to the concepts of the present invention where the number of address parity bits, can either be reduced to one or increased to more than two. Table IV given below provides another embodiment of the present invention where eight address parity bits are generated and used.

TABLE IV

| DATA | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 1000 | 1000 | 1000 | 1000 | 1000 | 1000 | 1000 | 1000 | 1001 | 1101 | 1111 | 0011 | 1100 | 1100 | 1110 | 0110 |
| 0100 | 0100 | 0100 | 0100 | 0100 | 0100 | 0100 | 0100 | 0111 | 1011 | 1010 | 0010 | 1000 | 1000 | 1001 | 1101 |
| 0010 | 0010 | 0010 | 0010 | 0010 | 0010 | 0010 | 0010 | 0111 | 0110 | 1100 | 1111 | 0011 | 0011 | 1001 | 1011 |
| 0001 | 0001 | 0001 | 0001 | 0001 | 0001 | 0001 | 0001 | 1110 | 1101 | 1000 | 1010 | 0010 | 0010 | 0111 | 0110 |
| 0110 | 1000 | 0010 | 1011 | 1010 | 1101 | 0101 | 1110 | 1000 | 0001 | 1000 | 0111 | 1000 | 1110 | 1000 | 0100 |
| 1101 | 0100 | 0001 | 0110 | 0101 | 1011 | 1111 | 1001 | 0100 | 0011 | 0100 | 1110 | 0100 | 1001 | 0100 | 1100 |
| 1011 | 0010 | 1010 | 1101 | 1000 | 0110 | 0100 | 1001 | 0010 | 0101 | 0010 | 1110 | 0010 | 1001 | 0010 | 0001 |
| 0110 | 0001 | 0101 | 1011 | 0100 | 1101 | 1100 | 0111 | 0001 | 1111 | 0001 | 1001 | 0001 | 0111 | 0001 | 0011 |
| 1000 | 1110 | 0111 | 1010 | 1001 | 0010 | 0110 | 0001 | 0101 | 1000 | 1011 | 1000 | 0110 | 1000 | 0100 | 1000 |
| 0100 | 1001 | 1110 | 0101 | 0111 | 0001 | 1101 | 0011 | 1111 | 0100 | 0110 | 0100 | 1101 | 0100 | 1100 | 0100 |
| 0010 | 1001 | 1110 | 1000 | 0111 | 1010 | 1011 | 0101 | 0100 | 0010 | 1101 | 0010 | 1011 | 0010 | 0001 | 0010 |
| 0001 | 0111 | 1001 | 0100 | 1110 | 0101 | 0110 | 1111 | 1100 | 0001 | 1011 | 0001 | 0110 | 0001 | 0011 | 0001 |

| | ECC | | | SYMBOL ID (CHIP) | ADDRESS PARITY BITS | |
|---|---|---|---|---|---|---|
| | 17 | 18 | 19 | ID | 20 | 21 |
| | 1000 | 0000 | 0000 | --- | 0111 | 1101 |
| | 0100 | 0000 | 0000 | --- | 1111 | 0010 |
| | 0010 | 0000 | 0000 | --- | 1011 | 0111 |
| | 0001 | 0000 | 0000 | --- | 1100 | 1101 |
| | 0000 | 1000 | 0000 | --- | 1000 | 0011 |
| | 0000 | 0100 | 0000 | --- | 0110 | 0111 |
| | 0000 | 0010 | 0000 | --- | 0001 | 0010 |
| | 0000 | 0001 | 0000 | --- | 0000 | 1110 |
| | 0000 | 0000 | 1000 | --- | 0000 | 1100 |
| | 0000 | 0000 | 0100 | --- | 0001 | 1010 |
| | 0000 | 0000 | 0010 | --- | 0110 | 1000 |
| | 0000 | 0000 | 0001 | --- | 1011 | 1001 |

DATA FETCH OPERATION

Figure 7:
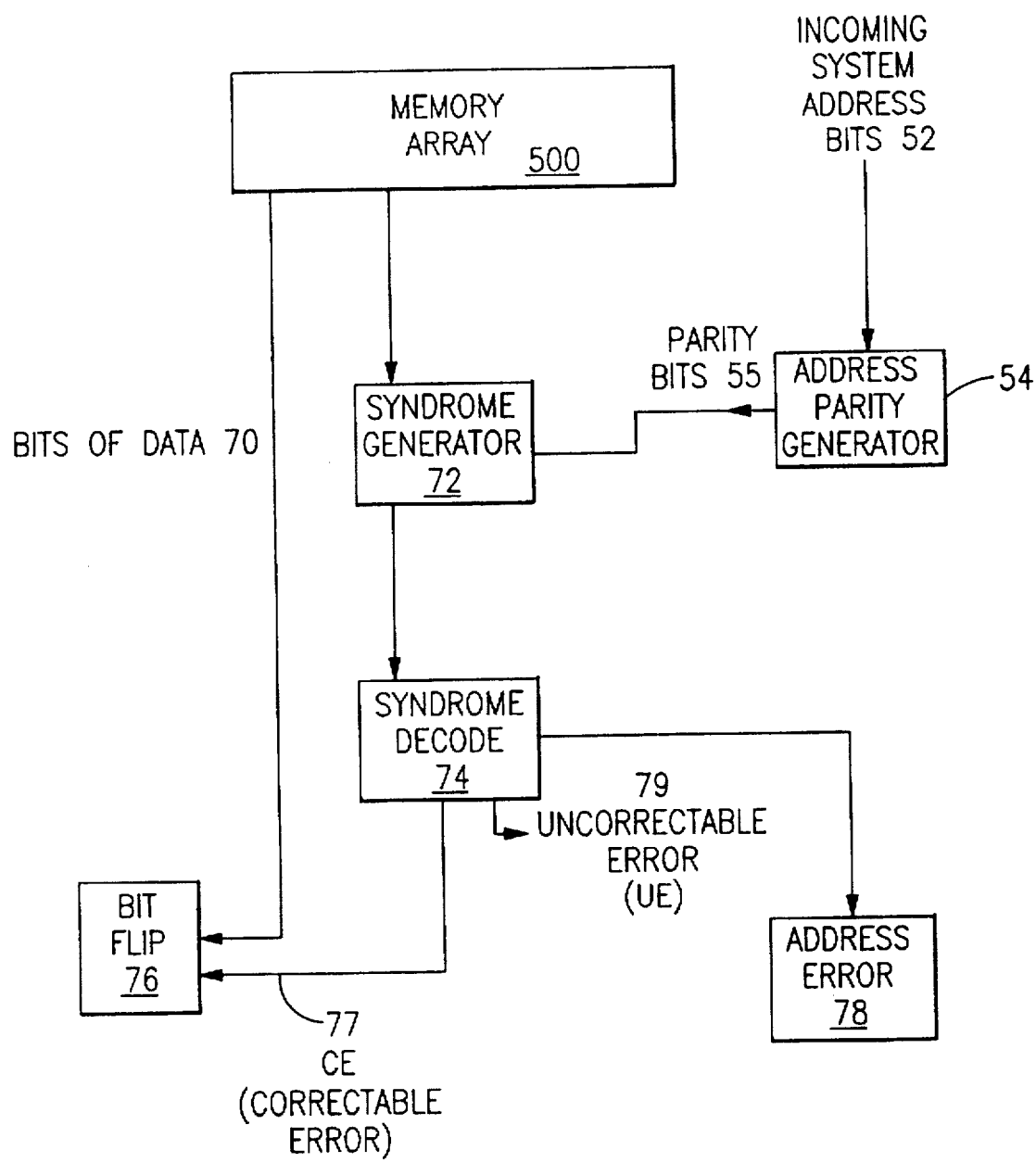
FIG. 7 is an illustration of the processing of bits during a data fetch operation.
Figure 8:
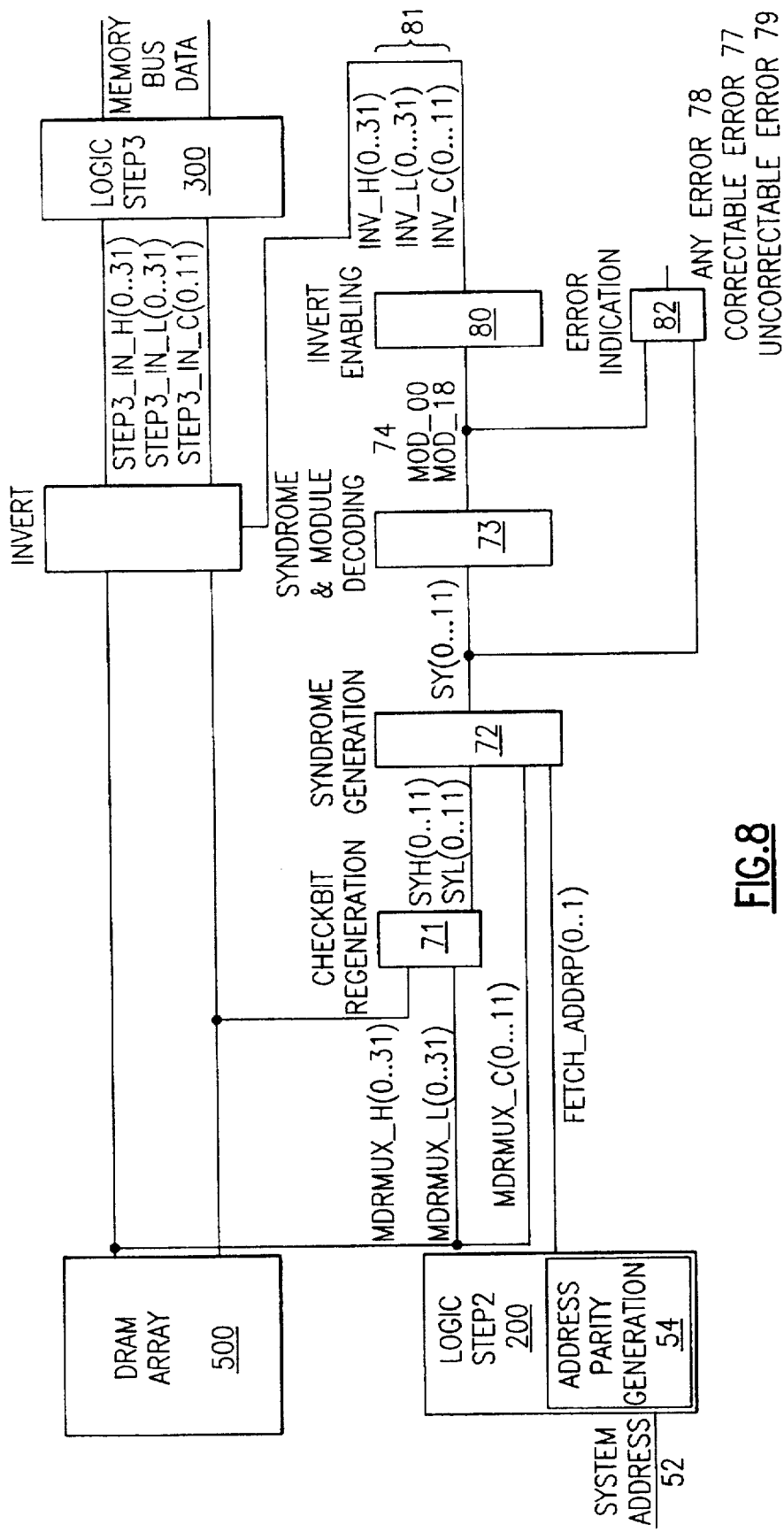
FIG. 8 is a further illustration of the operation of a data fetch command according to the concepts presented by the present invention.

During a Fetch operation, the reverse of the store process implemented during the store operation is used as shown in FIGS. 7 and 8. Data 70, 72 and 55, including the ECC word, is first fetched from memory 500, as shown in FIG. 7. FIG. 9 illustrates the circuits used during an ECC fetch operation. Data fetched from the DRAM array chips are named MDRMUX_H(0 . . . 31) 92 for modules 1 to 8, MDRMUX_L(0 . . . 31) 94 for modules 9 to 16 and MDRMUX_C(0 . . . 11) 96 for modules 17 to 19.

When data is fetched from storage, a set of partial syndrome bits SYH(0 . . . 11) and SYL(0 . . . 11) is generated from the fetched data word from the DRAM array chips or the MDRMUX as illustrated in detail by the following equation:

```
/*********** FETCH ECC *****************************************/
/******************************************************************/ /*>
          CHECKBIT REGENERATION          <*/
/******************************************************************/
           SYH(0) := OPA (MDRMUX_H(0)    | MDRMUX_H(4)   | MDRMUX_H(8)   | MDRMUX_H(12)
                       | MDRMUX_H(16)   | MDRMUX_H(20)  | MDRMUX_H(24)  | MDRMUX_H(28));
           SYL(0) := OPA (MDRMUX_L(0)    | MDRMUX_L(3)   | MDRMUX_L(4)   | MDRMUX_L(5)
                       | MDRMUX_L(7)    | MDRMUX_L(8)   | MDRMUX_L(9)   | MDRMUX_L(10)
                       | MDRMUX_L(11)   | MDRMUX_L(14)  | MDRMUX_L(15)  | MDRMUX_L(16)
                       | MDRMUX_L(17)   | MDRMUX_L(20)  | MDRMUX_L(21)  | MDRMUX_L(24)
                       | MDRMUX_L(25)   | MDRMUX_L(26)  | MDRMUX_L(29)  | MDRMUX_L(30));
           SYH(1) := OPA (MDRMUX_H(1)    | MDRMUX_H(5)   | MDRMUX_H(9)   | MDRMUX_H(13)
                       | MDRMUX_H(17)   | MDRMUX_H(21)  | MDRMUX_H(25)  | MDRMUX_H(29));
           SYL(1) := OPA (MDRMUX_L(1)    | MDRMUX_L(2)   | MDRMUX_L(3)   | MDRMUX_L(4)
                       | MDRMUX_L(6)    | MDRMUX_L(7)   | MDRMUX_L(8)   | MDRMUX_L(10)
```

```
                    | MDRMUX_L(14)   | MDRMUX_L(16)   | MDRMUX_L(20)   | MDRMUX_L(24)
                    | MDRMUX_L(27)   | MDRMUX_L(28)   | MDRMUX_L(29)   | MDRMUX_L(31));
SYH(2) := OPA (MDRMUX_H(2)    | MDRMUX_H(6)    | MDRMUX_H(10)   | MDRMUX_H(14)
                    | MDRMUX_H(18)   | MDRMUX_H(22)   | MDRMUX_H(26)   | MDRMUX_H(30));
SYL(2) := OPA (MDRMUX_L(1)    | MDRMUX_L(2)    | MDRMUX_L(3)    | MDRMUX_L(5)
                    | MDRMUX_L(6)    | MDRMUX_L(8)    | MDRMUX_L(9)    | MDRMUX_L(12)
                    | MDRMUX_L(13)   | MDRMUX_L(14)   | MDRMUX_L(15)   | MDRMUX_L(18)
                    | MDRMUX_L(19)   | MDRMUX_L(22)   | MDRMUX_L(23)   | MDRMUX_L(24)
                    | MDRMUX_L(27)   | MDRMUX_L(28)   | MDRMUX_L(30)   | MDRMUX_L(31));
SYH(3) := OPA (MDRMUX_H(3)    | MDRMUX_H(7)    | MDRMUX_H(11)   | MDRMUX_H(15)
                    | MDRMUX_H(19)   | MDRMUX_H(23)   | MDRMUX_H(27)   | MDRMUX_H(31));
SYL(3) := OPA (MDRMUX_L(0)    | MDRMUX_L(1)    | MDRMUX_L(2)    | MDRMUX_L(4)
                    | MDRMUX_L(5)    | MDRMUX_L(7)    | MDRMUX_L(8)    | MDRMUX_L(12)
                    | MDRMUX_L(14)   | MDRMUX_L(18)   | MDRMUX_L(22)   | MDRMUX_L(25)
                    | MDRMUX_L(26)   | MDRMUX_L(27)   | MDRMUX_L(29)   | MDRMUX_L(30));
SYH(4) := OPA (MDRMUX_H(1)    | MDRMUX_H(2)    | MDRMUX_H(4)    | MDRMUX_H(10)
                    | MDRMUX_H(12)   | MDRMUX_H(14)   | MDRMUX_H(15)   | MDRMUX_H(16)
                    | MDRMUX_H(18)   | MDRMUX_H(20)   | MDRMUX_H(21)   | MDRMUX_H(23)
                    | MDRMUX_H(25)   | MDRMUX_H(27)   | MDRMUX_H(28)   | MDRMUX_H(29)
                    | MDRMUX_H(30));
SYL(4) := OPA (MDRMUX_L(0)    | MDRMUX_L(7)    | MDRMUX_L(8)    | MDRMUX_L(13)
                    | MDRMUX_L(14)   | MDRMUX_L(15)   | MDRMUX_L(16)   | MDRMUX_L(20)
                    | MDRMUX_L(21)   | MDRMUX_L(22)   | MDRMUX_L(24)   | MDRMUX_L(29));
SYH(5) := OPA (MDRMUX_H(0)    | MDRMUX_H(1)    | MDRMUX_H(3)    | MDRMUX_H(5)
                    | MDRMUX_H(11)   | MDRMUX_H(13)   | MDRMUX_H(14)   | MDRMUX_H(17)
                    | MDRMUX_H(19)   | MDRMUX_H(20)   | MDRMUX_H(22)   | MDRMUX_H(23)
                    | MDRMUX_H(24)   | MDRMUX_H(25)   | MDRMUX_H(26)   | MDRMUX_H(27)
                    | MDRMUX_H(28)   | MDRMUX_H(31));
SYL(5) := OPA (MDRMUX_L(1)    | MDRMUX_L(6)    | MDRMUX_L(7)    | MDRMUX_L(9)
                    | MDRMUX_L(12)   | MDRMUX_L(13)   | MDRMUX_L(14)   | MDRMUX_L(17)
                    | MDRMUX_L(20)   | MDRMUX_L(23)   | MDRMUX_L(25)   | MDRMUX_L(28)
                    | MDRMUX_L(29));
SYH(6) := OPA (MDRMUX_H(0)    | MDRMUX_H(2)    | MDRMUX_H(3)    | MDRMUX_H(6)
                    | MDRMUX_H(8)    | MDRMUX_H(10)   | MDRMUX_H(12)   | MDRMUX_H(13)
                    | MDRMUX_H(15)   | MDRMUX_H(16)   | MDRMUX_H(21)   | MDRMUX_H(22)
                    | MDRMUX_H(25)   | MDRMUX_H(28)   | MDRMUX_H(31));
SYL(6) := OPA (MDRMUX_L(2)    | MDRMUX_L(5)    | MDRMUX_L(7)    | MDRMUX_L(10)
                    | MDRMUX_L(12)   | MDRMUX_L(13)   | MDRMUX_L(14)   | MDRMUX_L(18)
                    | MDRMUX_L(20)   | MDRMUX_L(23)   | MDRMUX_L(26)   | MDRMUX_L(31)
SYH(7) := OPA (MDRMUX_H(1)    | MDRMUX_H(2)    | MDRMUX_H(7)    | MDRMUX_H(9)
                    | MDRMUX_H(11)   | MDRMUX_H(12)   | MDRMUX_H(14)   | MDRMUX_H(15)
                    | MDRMUX_H(17)   | MDRMUX_H(20)   | MDRMUX_H(21)   | MDRMUX_H(23)
                    | MDRMUX_H(24)   | MDRMUX_H(25)   | MDRMUX_H(29)   | MDRMUX_H(30)
                    | MDRMUX_H(31));
SYL(7) := OPA (MDRMUX_L(3)    | MDRMUX_L(4)    | MDRMUX_L(5)    | MDRMUX_L(6)
                    | MDRMUX_L(7)    | MDRMUX_L(11)   | MDRMUX_L(12)   | MDRMUX_L(15)
                    | MDRMUX_L(19)   | MDRMUX_L(21)   | MDRMUX_L(22)   | MDRMUX_L(23)
                    | MDRMUX_L(27)   | MDRMUX_L(30)   | MDRMUX_L(31));
SYH(8) := OPA (MDRMUX_H(0)    | MDRMUX_H(4)    | MDRMUX_H(5)    | MDRMUX_H(6)
                    | MDRMUX_H(9)    | MDRMUX_H(10)   | MDRMUX_H(11)   | MDRMUX_H(12)
                    | MDRMUX_H(14)   | MDRMUX_H(16)   | MDRMUX_H(19)   | MDRMUX_H(22)
                    | MDRMUX_H(25)   | MDRMUX_H(26)   | MDRMUX_H(31));
SYL(8) := OPA (MDRMUX_L(1)    | MDRMUX_L(3)    | MDRMUX_L(4)    | MDRMUX_L(8)
                    | MDRMUX_L(10)   | MDRMUX_L(11)   | MDRMUX_L(12)   | MDRMUX_L(17)
                    | MDRMUX_L(18)   | MDRMUX_L(20)   | MDRMUX_L(25)   | MDRMUX_L(28));
SYH(9) := OPA (MDRMUX_H(1)    | MDRMUX_H(4)    | MDRMUX_H(7)    | MDRMUX_H(8)
                    | MDRMUX_H(9)    | MDRMUX_H(10)   | MDRMUX_H(13)   | MDRMUX_H(15)
                    | MDRMUX_H(17)   | MDRMUX_H(18)   | MDRMUX_H(19)   | MDRMUX_H(23)
                    | MDRMUX_H(24)   | MDRMUX_H(25)   | MDRMUX_H(27)   | MDRMUX_H(30)
                    | MDRMUX_H(31));
SYL(9) := OPA (MDRMUX_L(0)    | MDRMUX_L(1)    | MDRMUX_L(2)    | MDRMUX_L(3)
                    | MDRMUX_L(5)    | MDRMUX_L(9)    | MDRMUX_L(10)   | MDRMUX_L(13)
                    | MDRMUX_L(16)   | MDRMUX_L(17)   | MDRMUX_L(19)   | MDRMUX_L(21)
                    | MDRMUX_L(24)   | MDRMUX_L(25)   | MDRMUX_L(29));
SYH(10) := OPA (MDRMUX_H(2)   | MDRMUX_H(4)    | MDRMUX_H(7)    | MDRMUX_H(8)
                    | MDRMUX_H(9)    | MDRMUX_H(10)   | MDRMUX_H(12)   | MDRMUX_H(17)
                    | MDRMUX_H(18)   | MDRMUX_H(19)   | MDRMUX_H(20)   | MDRMUX_H(22)
                    | MDRMUX_H(24)   | MDRMUX_H(26)   | MDRMUX_H(27)   | MDRMUX_H(29)
                    | MDRMUX_H(31));
SYL(10) := OPA (MDRMUX_L(1)   | MDRMUX_L(6)    | MDRMUX_L(8)    | MDRMUX_L(9)
                    | MDRMUX_L(11)   | MDRMUX_L(14)   | MDRMUX_L(16)   | MDRMUX_L(18)
                    | MDRMUX_L(19)   | MDRMUX_L(22)   | MDRMUX_L(27)   | MDRMUX_L(30));
SYH(11) := OPA (MDRMUX_H(3)   | MDRMUX_H(5)    | MDRMUX_H(6)    | MDRMUX_H(7)
                    | MDRMUX_H(8)    | MDRMUX_H(11)   | MDRMUX_H(13)   | MDRMUX_H(16)
                    | MDRMUX_H(17)   | MDRMUX_H(18)   | MDRMUX_H(21)   | MDRMUX_H(23)
                    | MDRMUX_H(25)   | MDRMUX_H(26)   | MDRMUX_H(28)   | MDRMUX_H(29)
                    | MDRMUX_H(30)   | MDRMUX_H(31));
```

-continued

```
SYL(11) := OPA (MDRMUX_L(0)   | MDRMUX_L(1)   | MDRMUX_L(7)   | MDRMUX_L(8)
               | MDRMUX_L(10)  | MDRMUX_L(11)  | MDRMUX_L(15)  | MDRMUX_L(17)
               | MDRMUX_L(18)  | MDRMUX_L(23)  | MDRMUX_L(26)  | MDRMUX_L(27)
               | MDRMUX_L(31));
```

The same circuits that are used in generating the partial check bits during the store operations are utilized again to regenerate the partial syndrome bits. So for example, partial syndrome bit i is the Exclusive-OR of the fetched data word at positions specified by 1's in the ith row of the parity check matrix. That is to say that the partial syndrome bits are generated by supplying specified signals to a set of exclusive_OR gates.

The syndrome bits SY(0 . . . 11) are then generated from the combination of the fetched data from check bits MDRMUX_C(0 . . . 11) and the address parity bits from Fetch_ADDRP(0 . . . m) generated from the incoming system address bits.

```
/******************* Syndrome Generation **************************/
SY(0)   :=
MDRMUX_C(0)    XOR SYH(0)   XOR SYL(0)                          XOR FETCH_ADDRP(1);
SY(1)   :=
MDRMUX_C(1)    XOR SYH(1)   XOR SYL(1)
                                         XOR FETCH_ADDRP(0)     XOR FETCH_ADDRP(1);
SY(2)   :=
MDRMUX_C(2)    XOR SYH(2)   XOR SYL(2)   XOR FETCH ADDRP(0)                          ;
SY(3)   :=
MDRMUX_C(3)    XOR SYH(3)   XOR SYL(3)
                                         XOR FETCH_ADDRP(0)     XOR FETCH_ADDRP(1);
SY(4)   :=
MDRMUX_C(4)    XOR SYH(4)   XOR SYL(4)   XOR FETCH_ADDRP(0)                          ;
SY(5)   :=
MDRMUX_C(5)    XOR SYH(5)   XOR SYL(5)                          XOR FETCH_ADDRP(1);
SY(6)   :=
MDRMUX_C(6)    XOR SYH(6)   XOR SYL(6)                                              ;
SY(7)   :=
MDRMUX_C(7)    XOR SYH(7)   XOR SYL(7)                                              ;
SY(8)   :=
MDRMUX_C(8)    XOR SYH(8)   XOR SYL(8)                                              ;
SY(9)   :=
MDRMUX_C(9)    XOR SYH(9)   XOR SYL(9)                                              ;
SY(10)  :=
MDRMUX_C(10)   XOR SYH(10)  XOR SYL(10)                         XOR FETCH_ADDRP(1);
SY(11)  :=
MDRMUX_C(11)   XOR SYH(11)  XOR SYL(11)  XOR FETCH_ADDRP(0)                          ;
```

The partial syndrome bits SY(0 . . . 11) 72 are then decoded 74 to identify any possible errors as illustrated in FIG. 7. Module error indicators are then generated according to the formula given below during the decoding process to detect and indicate errors.

```
/* **** Syndrome & Module Decoding ********************************/ /*
*/ /* MOD_00 means: The most left nodule 0 is defective            */
MOD_00 :=  (                    SY( 1)  XOR  SY( 2)                    XOR  ^SY( 4) )
          &( SY( 0)  XOR  SY( 1)                    XOR  SY( 3)  XOR  ^SY( 5) )
          &( SY( 0)                    XOR  SY( 2)  XOR  SY( 3)  XOR  ^SY( 6) )
          &(                    SY( 1)  XOR  SY( 2)                    XOR  ^SY( 7) )
          &( SY( 0)                                                    XOR  ^SY( 8) )
          &(                    SY( 1)                                 XOR  ^SY( 9) )
          &(                                 SY( 2)                    XOR  ^SY(10) )
          &(                                              SY( 3)  XOR  ^SY(11) ) ;
```

```
MOD_01 := (  SY( 0)                                          XOR ^SY( 4) )
         &(                    SY( 1)                         XOR ^SY( 5) )
         &(                             SY( 2)                XOR ^SY( 6) )
         &(                                      SY( 3)      XOR ^SY( 7) )
         &(  SY( 0) XOR SY( 1) XOR SY( 2)                    XOR ^SY( 8) )
         &(  SY( 0)                            XOR SY( 3)    XOR ^SY( 9) )
         &(  SY( 0)                            XOR SY( 3)    XOR ^SY(10) )
         &(                    SY( 1) XOR SY( 2) XOR SY( 3)  XOR ^SY(11) );
MOD_02 := (                            SY( 2)                XOR ^SY( 4) )
         &(                                      SY( 3)      XOR ^SY( 5) )
         &(  SY( 0)                   XOR SY( 2)             XOR ^SY( 6) )
         &(                    SY( 1)          XOR SY( 3)    XOR ^SY( 7) )
         &(                    SY( 1) XOR SY( 2) XOR SY( 3)  XOR ^SY( 8) )
         &(  SY( 0) XOR SY( 1) XOR SY( 2)                    XOR ^SY( 9) )
         &(  SY( 0) XOR SY( 1) XOR SY( 2)                    XOR ^SY(10) )
         &(  SY( 0)                            XOR SY( 3)    XOR ^SY(11) );
MOD_03 := (  SY( 0)          XOR SY( 2) XOR SY( 3)           XOR ^SY( 4) )
         &(                    SY( 1) XOR SY( 2)             XOR ^SY( 5) )
         &(  SY( 0) XOR SY( 1)                   XOR SY( 3)  XOR ^SY( 6) )
         &(  SY( 0)                   XOR SY( 2) XOR SY( 3)  XOR ^SY( 7) )
         &(  SY( 0)                   XOR SY( 2)             XOR ^SY( 8) )
         &(                    SY( 1)          XOR SY(3)     XOR ^SY( 9) )
         &(  SY( 0)                                          XOR ^SY(10) )
         &(                    SY( 1)                        XOR ^SY(11) );
MOD_04 := (  SY( 0)                   XOR SY( 2)             XOR ^SY( 4) )
         &(                    SY( 1)          XOR SY( 3)    XOR ^SY( 5) )
         &(  SY( 0)                                          XOR ^SY( 6) )
         &(                    SY( 1)                        XOR ^SY( 7) )
         &(  SY( 0)                            XOR SY( 3)    XOR ^SY( 8) )
         &(                    SY( 1) XOR SY( 2) XOR SY( 3)  XOR ^SY( 9) )
         &(                    SY( 1) XOR SY( 2) XOR SY( 3)  XOR ^SY(10) )
         &(  SY( 0) XOR SY( 1) XOR SY( 2)                    XOR ^SY(11) );
MOD_05 := (  SY( 0) XOR SY( 1)                   XOR SY( 3)  XOR ^SY( 4) )
         &(  SY( 0)                   XOR SY( 2) XOR SY( 3)  XOR ^SY( 5) )
         &(                    SY( 1) XOR SY( 2)             XOR ^SY( 6) )
         &(  SY( 0) XOR SY( 1)                   XOR SY( 3)  XOR ^SY( 7) )
         &(                             SY( 2)               XOR ^SY( 8) )
         &(                                      SY( 3)      XOR ^SY( 9) )
         &(  SY( 0)                   XOR SY( 2)             XOR ^SY(10) )
         &(                    SY( 1)          XOR SY( 3)    XOR ^SY(11) );
MOD_06 := (                    SY( 1)          XOR SY( 3)    XOR ^SY( 4) )
         &(  SY( 0) XOR SY( 1) XOR SY( 2) XOR SY( 3)         XOR ^SY( 5) )
         &(                    SY( 1)                        XOR ^SY( 6) )
         &(  SY( 0) XOR SY( 1)                                XOR ^SY( 7) )
         &(                    SY( 1) XOR SY( 2)             XOR ^SY( 8) )
         &(  SY( 0) XOR SY( 1)                   XOR SY( 3)  XOR ^SY( 9) )
         &(  SY( 0)                   XOR SY( 2) XOR SY( 3)  XOR ^SY(10) )
         &(                    SY( 1) XOR SY( 2)             XOR ^SY(11) );
MOD_07 := (  SY( 0) XOR SY( 1) XOR SY( 2)                    XOR ^SY( 4) )
         &(  SY( 0)                            XOR SY( 3)    XOR ^SY( 5) )
         &(  SY( 0)                            XOR SY( 3)    XOR ^SY( 6) )
         &(                    SY( 1) XOR SY( 2) XOR SY( 3)  XOR ^SY( 7) )
         &(                                      SY( 3)      XOR ^SY( 8) )
         &(                             SY( 2) XOR SY( 3)    XOR ^SY( 9) )
         &(                    SY( 1)          XOR SY( 3)    XOR ^SY(10) )
         &(  SY( 0) XOR SY( 1) XOR SY( 2) XOR SY( 3)         XOR ^SY(11) );
MOD_08 := (  SY( 4)                            XOR SY( 7)    XOR ^SY( 0) )
         &(                    SY( 5) XOR SY( 6) XOR SY( 7)  XOR ^SY( 1) )
         &(                    SY( 5) XOR SY( 6) XOR SY( 7)  XOR ^SY( 2) )
         &(  SY( 4) XOR SY( 5) XOR SY( 6)                    XOR ^SY( 3) )
         &(                    SY( 5)          XOR SY( 7)    XOR ^SY( 8) )
         &(  SY( 4) XOR SY( 5) XOR SY( 6) XOR SY( 7)         XOR ^SY( 9) )
         &(                    SY( 5)                        XOR ^SY(10) )
         &(  SY( 4) XOR SY( 5)                               XOR ^SY(11) );
MOD_09 := (  SY( 8) XOR SY( 9)                               XOR ^SY( 0) )
         &(  SY( 8)                   XOR SY(10) XOR SY(11)  XOR ^SY( 1) )
         &(                    SY( 9) XOR SY(10)             XOR ^SY( 2) )
         &(  SY( 8) XOR SY( 9)                   XOR SY(11)  XOR ^SY( 3) )
         &(                                      SY(11)      XOR ^SY( 4) )
         &(                             SY(10) XOR SY(11)    XOR ^SY( 5) )
         &(                    SY( 9)          XOR SY(11)    XOR ^SY( 6) )
         &(  SY( 8) XOR SY( 9) XOR SY(10) XOR SY(11)         XOR ^SY( 7) );
```

-continued

```
MOD_10 :=  (   SY( 4)  XOR  SY( 5)  XOR  SY( 6)  XOR  SY( 7)  XOR  *SY( 0) )
         &(   SY( 4)                     XOR  SY( 6)                XOR  *SY( 1) )
         &(   SY( 4)  XOR  SY( 5)                                   XOR  *SY( 2) )
         &(   SY( 4)                                                XOR  *SY( 3) )
         &(   SY( 4)                     XOR  SY( 6)  XOR  SY( 7)  XOR  *SY( 8) )
         &(                SY( 5)  XOR  SY( 6)                     XOR  *SY( 9) )
         &(   SY( 4)  XOR  SY( 5)                XOR  SY( 7)       XOR  *SY(10) )
         &(   SY( 4)                XOR  SY( 6)  XOR  SY( 7)       XOR  *SY(11) ) ;
MOD 11 :=  (                                          SY(10) XOR  SY(11) XOR  *SY( 0) )
         &(                                          SY(10)             XOR  *SY( 1) )
         &(   SY( 8)  XOR  SY( 9)  XOR  SY(10) XOR  SY(11) XOR  *SY( 2) )
         &(   SY( 8)                XOR  SY(10)            XOR  *SY( 3) )
         &(                SY( 9)  XOR  SY(10) XOR  SY(11) XOR  *SY( 4) )
         &(   SY( 8)  XOR  SY( 9)  XOR  SY(10)            XOR  *SY( 5) )
         &(   SY( 8)  XOR  SY( 9)  XOR  SY(10)            XOR  *SY( 6) )
         &(   SY( 8)                           XOR  SY(11) XOR  *SY( 7) ) ;
MOD_12 :=  (   SY( 4)  XOR  SY( 5)                                XOR  *SY( 0) )
         &(   SY( 4)                                                XOR  *SY( 1) )
         &(                           SY( 6)  XOR  SY( 7)       XOR  *SY( 2) )
         &(                           SY( 6)                        XOR  *SY( 3) )
         &(                SY( 5)  XOR  SY( 6)                     XOR  *SY( 8) )
         &(   SY( 4)  XOR  SY( 5)                XOR  SY( 7)       XOR  *SY( 9) )
         &(   SY( 4)                XOR  SY( 6)  XOR  SY( 7)       XOR  *SY(10) )
         &(                SY( 5)  XOR  SY( 6)                     XOR  *SY(11) ) ;
MOD_13 :=  (   SY( 8)  XOR  SY( 9)                                XOR  *SY( 0) )
         &(   SY( 8)                                                XOR  *SY( 1) )
         &(                                          SY(10) XOR  SY(11) XOR  *SY( 2) )
         &(                                          SY(10)             XOR  *SY( 3) )
         &(   SY( 8)  XOR  SY( 9)  XOR  SY(10)            XOR  *SY( 4) )
         &(   SY( 8)                           XOR  SY(11) XOR  *SY( 5) )
         &(   SY( 8)                           XOR  SY(11) XOR  *SY( 6) )
         &(                SY( 9)  XOR  SY(10) XOR  SY(11) XOR  *SY( 7) ) ;
MOD_14 :=  (   SY( 4)  XOR  SY( 5)  XOR  SY( 6)                     XOR  *SY( 0) )
         &(   SY( 4)                                XOR  SY( 7)       XOR  *SY( 1) )
         &(   SY( 4)                                XOR  SY( 7)       XOR  *SY( 2) )
         &(                SY( 5)  XOR  SY( 6)  XOR  SY( 7)       XOR  *SY( 3) )
         &(                SY( 5)                                   XOR  *SY( 8) )
         &(   SY( 4)  XOR  SY( 5)                                   XOR  *SY( 9) )
         &(                                     SY( 7)             XOR  *SY(10) )
         &(                           SY( 6)  XOR  SY( 7)             XOR  *SY(11) ) ;
MOD_15 :=  (                SY( 9)  XOR  SY(10)                     XOR  *SY( 0) )
         &(   SY( 8)  XOR  SY( 9)                XOR  SY(11) XOR  *SY( 1) )
         &(   SY( 8)                XOR  SY(10) XOR  SY(11) XOR  *SY( 2) )
         &(                SY( 9)  XOR  SY(10)            XOR  *SY( 3) )
         &(                SY( 9)                                   XOR  *SY( 4) )
         &(   SY( 8)  XOR  SY( 9)                                   XOR  *SY( 5) )
         &(                                     SY(11) XOR  *SY( 6) )
         &(                           SY(10) XOR  SY(11) XOR  *SY( 7) ) ;
MOD_16 :=  (                                                        *SY( 4) )
         &(                                                        *SY( 5) )
         &(                                                        *SY( 6) )
         &(                                                        *SY( 7) )
         &(                                                        *SY( 8) )
         &(                                                        *SY( 9) )
         &(                                                        *SY(10) )
         &(                                                        *SY(11) ) ;
MOD_17 :=  (                                                        *SY( 0) )
         &(                                                        *SY( 1) )
         &(                                                        *SY( 2) )
         &(                                                        *SY( 3) )
         &(                                                        *SY( 8) )
         &(                                                        *SY( 9) )
         &(                                                        *SY(10) )
         &(                                                        *SY(11) ) ;
MOD_18 :=  (                                                        *SY( 0) )
         &(                                                        *SY( 1) )
         &(                                                        *SY( 2) )
         &(                                                        *SY( 3) )
         &(                                                        *SY( 4) )
         &(                                                        *SY( 5) )
         &(                                                        *SY( 6) )
         &(                                                        *SY( 7) ) ;
```

FIG. 8 illustrates a set of module errors indicators MOD_ ∞, MOD_01, . . . MOD_18 74. Any error will cause the setting of one of the MOD's. For example an error in module 0 will cause MOD_00 to be set to 1. During the decoding operations, bit error indicators are also generated from circuit lines which are later used to invert the fetched data bits to correct certain errors. Invert lines 81 INV_H(0 . . . 31) 84, INV_L(0 . . . 31), and INV_C(0 . . . 11) are used in conjunction with bit errors so that when a bit error indicator is on, the corresponding data bit is corrected by inversion of the data. Bit error indicators 82 are generated from the following equations.

```
/* ********** Invert Enabling *************************/
INV_H(0...3)    := MOD_00 GATE SY(0...3);
INV_H(4...7)    := MOD_01 GATE SY(0...3);
INV_H(8...11)   := MOD_02 GATE SY(0...3);
INV_H(12...15)  := MOD_03 GATE SY(0...3);
INV_H(16...19)  := MOD_04 GATE SY(0...3);
INV_H(20...23)  := MOD_05 GATE SY(0...3);
INV_H(24...27)  := MOD_06 GATE SY(0...3);
INV_H(28...31)  := MOD_07 GATE SY(0...3);
INV_L(0...3)    := MOD_08 GATE SY(4...7);
INV_L(4...7)    := MOD_09 GATE SY(8...11);
INV_L(8...11)   := MOD_10 GATE SY(4...7);
INV_L(12...15)  := MOD_11 GATE SY(8...11);
INV_L(16...19)  := MOD_12 GATE SY(4...7);
INV_L(20...23)  := MOD_13 GATE SY(8...11);
INV_L(24...27)  := MOD_14 GATE SY(4...7);
INV_L(28...31)  := MOD_15 GATE SY(8...11);
INV_C(0...3)    := MOD_16 GATE SY(0...3);
INV_C(4...7)    := MOD_17 GATE SY(4...7);
INV_C(8...11)   := MOD_18 GATE SY(8...11);
```

In this manner, the status of the module error and the syndromes are to enable a plurality of invert lines and generate other signals pertaining to types of errors 78 including a UE (Uncorrectable error) signal 79 or a CE (Correctable Error) signal 77.

```
/*************** Error Indication ******************************/
ECC_ANYE :=    SY( 0) | SY( 1) | SY( 2) | SY( 3) |
               SY( 4) | SY( 5) | SY( 6) | SY( 7) |
               SY( 8) | SY( 9) | SY(10) | SY(11) ;
ECC_CE   :=(   MOD_00 | MOD_01 | MOD_02 | MOD_03  |
               MOD_04 | MOD_05 | MOD_06 | MOD_07  |
               MOD_08 | MOD_09 | MOD_10 | MOD_11  |
               MOD_12 | MOD_13 | MOD_14 | MOD_15  |
               MOD_16 | MOD_17 | MOD_18           );
ECC_UCE  :=ECC_ANYE & ÊĈĈ_CE;
/***************************************************************/ /*>
INVERT AND FETCH_ECC_OUTPUT                                    <*/
/***************************************************************/
STEP3_IN_H(0..31)  := MDRMUX_OUT_H(0..31)  XOR INV_H(0..31);
STEP3_IN_L(0..31)  := MDRMUX_OUT_L(0..31)  XOR INV_L(0..31);
STEP3_IN_C(0..11)  := MDRMUX_OUT_C(0..11)  XOR INV_C(0..11);
```

Figure 9B:
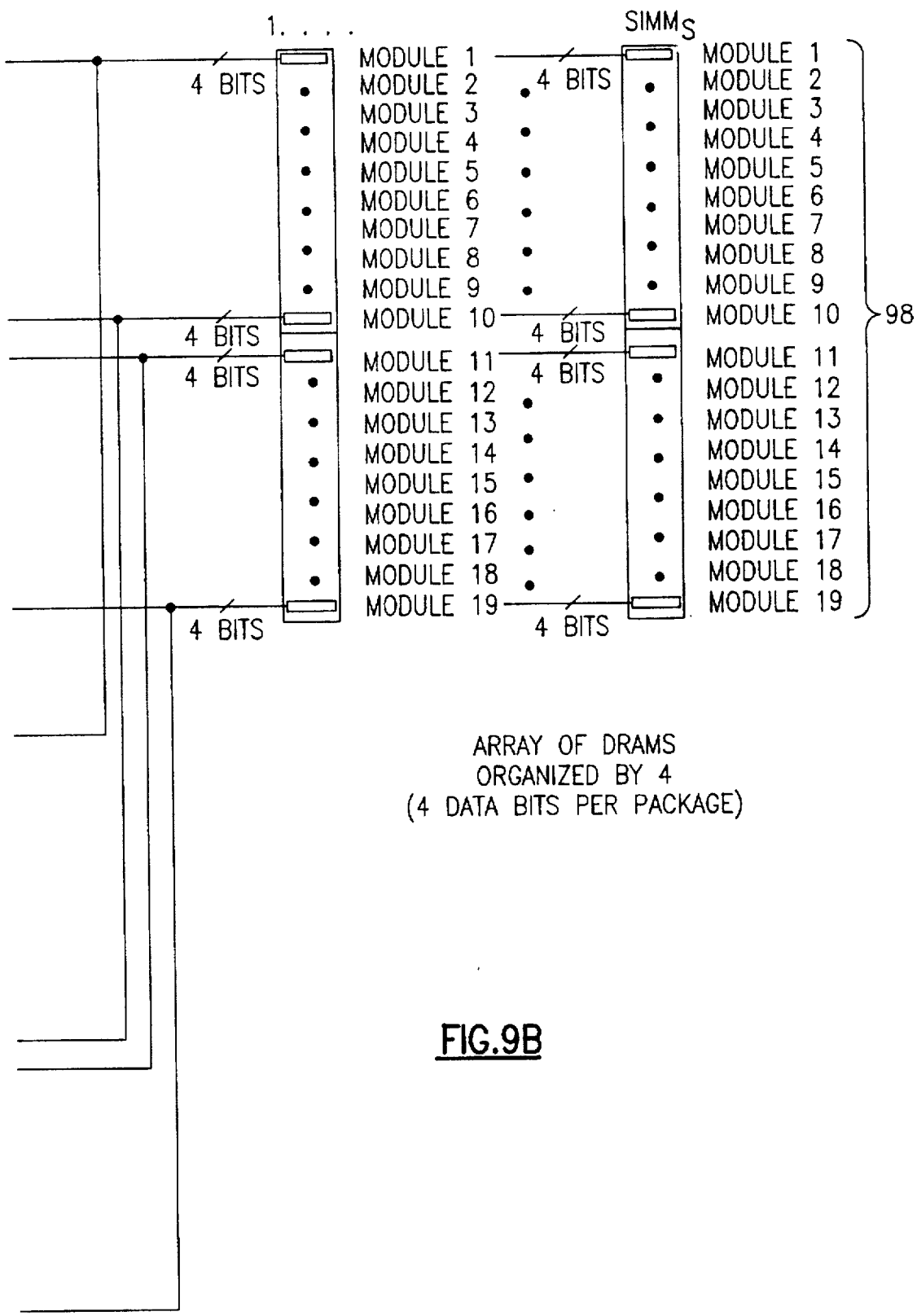

FIGS. 9, 9A and 9B illustrates the arrangement of data in the memory modules on the SIMMs. There are 19 memory modules in a SIMM; a number of SIMMS can therefore be configured in this way into the memory. As illustrated, the data bits and check bits are divided into 4 bit symbols to store in 19 memory modules. SEC_O_H(0 . . . 31) are stored in modules 1 to 8, SEC_O_L(0 . . . 31) are stored in modules 9 to 16, and SEC_OC(0 . . . 11) are stored in modules 17 to 19. The mapping of system address bits to memory modules depends on the module size as shown in Table IV and FIGS. 9, 9A and 9B.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. A method of generating at least two address parity bits in a computer system from a string of received incoming system address bits, said method comprising the steps of:

dividing said incoming system address bits into two groups where said first group includes only high bits having a value of "1", and said second group includes only low bits having a value or "0";

generating at least one address parity bit from each of said two groups by combining all bits of said first group to generate at least one high address parity bit, and combining all bits of said second group to generate at least one low address parity bit.

2. The method of claim 1, wherein two address parity bits are generated for each group.

3. The method of claim 1, wherein four address parity bits are generated for each group.

4. The method of claim 1, wherein eight address parity bits are generated for each group.

5. The method of claim 1 wherein said incoming address bits are at least 34 bits in length and bits 03, 04 and bits 15 through 25 and bit 31 are grouped together to form at least one address parity bit, said bits having all similar values.

6. The method of claim 1, wherein said incoming address bits are at least 34 bits in length and bits 0, 1, 4 through 14, 26, 27 and 30 are grouped together to form at least one address parity bits said bits having all similar values.

7. An apparatus for generating at least two address parity bits in a computer system from a string of received incoming system address bits, said apparatus comprising:

means for dividing said system address bits into two groups where said first group includes only high bits having a value of "1", and said second group includes only low bits having a value or "0";

a generator for generating at least one address parity bit from each of said two groups; and at least one high address parity bit generated by combining all bits of said first group; and at least one low address parity bit generated by combining all bits all bits of said second group.

* * * * *